US011020882B2

(12) United States Patent
Schneebauer et al.

(10) Patent No.: US 11,020,882 B2
(45) Date of Patent: Jun. 1, 2021

(54) INJECTION MOULDING MACHINE HAVING A COATING INSTALLATION

(71) Applicant: KRAUSSMAFFEI TECHNOLOGIES GMBH, Munich (DE)

(72) Inventors: Martin Schneebauer, Munich (DE); Florian Eilhardt, Munich (DE); Bernd Klotz, Günding/Bergkirchen (DE); Matthias Dykhuis, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 434 days.

(21) Appl. No.: 15/765,675

(22) PCT Filed: Oct. 5, 2016

(86) PCT No.: PCT/EP2016/073714
§ 371 (c)(1),
(2) Date: Apr. 3, 2018

(87) PCT Pub. No.: WO2017/063922
PCT Pub. Date: Apr. 20, 2017

(65) Prior Publication Data
US 2019/0084195 A1 Mar. 21, 2019

(30) Foreign Application Priority Data
Oct. 12, 2015 (DE) ...................... 10 2015 117 309.3

(51) Int. Cl.
*B29C 45/14* (2006.01)
*B29C 37/00* (2006.01)
(Continued)

(52) U.S. Cl.
CPC ........ *B29C 37/0028* (2013.01); *B29B 7/7457* (2013.01); *B29B 7/86* (2013.01);
(Continued)

(58) Field of Classification Search
CPC .............................................. B29C 2045/1685
See application file for complete search history.

(56) References Cited

U.S. PATENT DOCUMENTS 4,150,074 A * 4/1979 Tilgner ................... B29B 7/603
264/40.7
6,156,257 A * 12/2000 Tachi ..................... B29B 7/7663
264/102
(Continued)

FOREIGN PATENT DOCUMENTS

CN 101394981 * 3/2009 ............. B29C 45/16
DE 10024620 A1 9/2001
(Continued)

OTHER PUBLICATIONS

Marco, Gruber, CN101394981 English Translation (Year: 2009).*
(Continued)

*Primary Examiner* — Jacob T Minskey
*Assistant Examiner* — Adrien J Bernard
(74) *Attorney, Agent, or Firm* — Henry M. Feiereisen LLC

(57) ABSTRACT

The invention relates to an injection moulding machine having a coating installation, wherein the injection moulding machine has at least one fixed platen and one movable platen for the fastening of mould tool halves of at least one mould tool, and the coating installation has first pressure-generating and/or first pressure-conducting means for coating components at a first, relatively low pressure level and second pressure-generating and/or second pressure-conducting means for the coating components at a second, relatively high pressure level, wherein at least all second pressure-generating and all second pressure-conducting means are coupled to the movable platen so as to be jointly movable along a movement path of the movable platen.

17 Claims, 9 Drawing Sheets

(51) Int. Cl.
  *B29C 45/16* (2006.01)
  *B29C 67/24* (2006.01)
  *B29B 7/74* (2006.01)
  *B29B 7/86* (2006.01)
  *B29K 75/00* (2006.01)
  *B29C 45/03* (2006.01)

(52) U.S. Cl.
  CPC .............. *B29C 45/14* (2013.01); *B29C 45/16* (2013.01); *B29C 45/1628* (2013.01); *B29C 45/1679* (2013.01); *B29C 67/246* (2013.01); *B29C 2037/0035* (2013.01); *B29C 2045/033* (2013.01); *B29C 2045/1632* (2013.01); *B29C 2045/1685* (2013.01); *B29K 2075/00* (2013.01)

(56) References Cited

U.S. PATENT DOCUMENTS

| | | |
|---|---|---|
| 6,558,603 B2 | 5/2003 | Klotz et al. |
| 6,596,218 B2 | 7/2003 | Klotz |
| 7,824,597 B2 | 11/2010 | Klotz |
| 9,289,928 B2 | 3/2016 | Klotz |
| 2003/0164564 A1 | 9/2003 | Klotz |
| 2004/0130049 A1* | 7/2004 | Begemann ............ B29B 7/7615 264/40.1 |
| 2005/0156352 A1 | 7/2005 | Burkle |
| 2009/0085235 A1 | 4/2009 | Klotz et al. |
| 2016/0368187 A1 | 12/2016 | Schneebauer et al. |

FOREIGN PATENT DOCUMENTS

| | | |
|---|---|---|
| DE | 102006009900 A1 | 9/2007 |
| DE | 102006010310 A1 | 9/2007 |
| DE | 102006020696 A1 | 11/2007 |
| DE | 102007050332 A1 | 4/2009 |
| DE | 102010063751 A1 | 6/2012 |
| EP | 1993802 B1 | 11/2008 |
| JP | S6349914 U | 4/1988 |
| JP | 2010167662 A | 8/2010 |
| WO | WO 03013824 A1 | 2/2003 |

OTHER PUBLICATIONS

International Search Report issued by the European Patent Office in International Application PCT/EP2016/073714.
Anonymous: "Liquid Injection Molding Dosiersysteme".
Anonymous: "Innovative Misch—und Dosiermaschinen".
Translation of Anonymous: "Innovative Misch—und Dosiermaschinen".
Anonymous: "Hochwertige Premiumoberflache aus Spritzgiess—und Reaktionstechnik".
Translation of Anonymous: "Hochwertige Premiumoberflache aus Spritzgiess—und Reaktionstechnik".

* cited by examiner

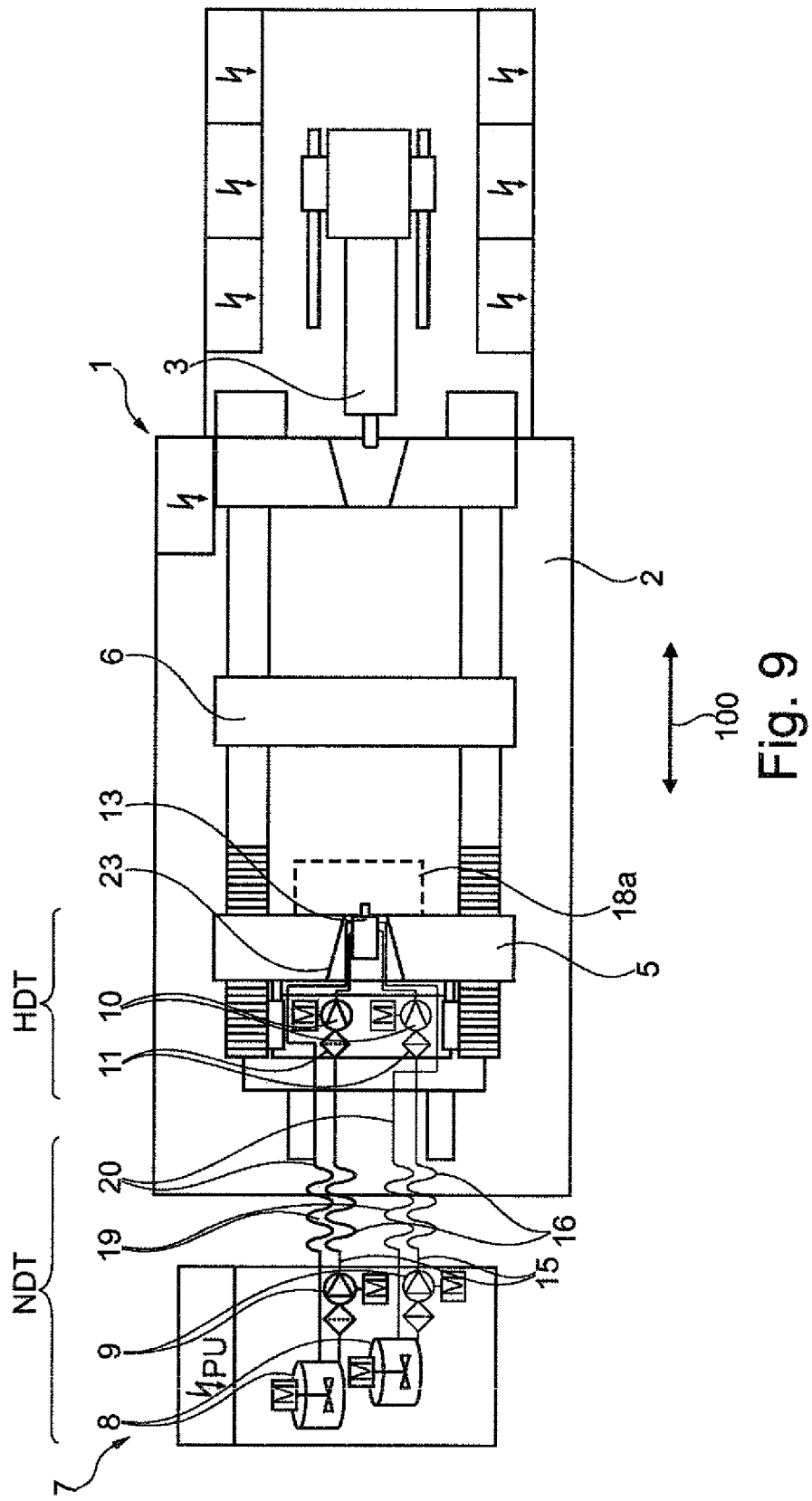

INJECTION MOULDING MACHINE HAVING A COATING INSTALLATION

CROSS-REFERENCES TO RELATED APPLICATIONS

This application is the U.S. National Stage of International Application No. PCT/EP2016/073714, filed Oct. 5, 2016, which designated the United States and has been published as International Publication No. WO 2017/063922 and which claims the priority of German Patent Application, Serial No. 10 2015 117 309.3, filed Oct. 12, 2015, pursuant to 35 U.S.C. 119(a)-(d).

BACKGROUND OF THE INVENTION

The invention relates to an injection moulding machine having a coating installation for the production of coated injection moulded parts.

A generic injection moulding machine having a coating installation, e.g. a RIM installation, is known from EP 1 993 802 B1 or from its German patent application DE 10 2006 009 900 A1 laid open to public inspection, giving rise to a right of priority. A RIM coating installation is understood to mean a reaction injection moulding installation (RIM installation), in which a two-component reactive mixture is injected into a cavity by means of a mixing head, and hardens reactively within the cavity, in particular as a surface coating for an already pre-formed injection moulded blank, and thus forms a surface coating. Basically, such a coating technique, which takes place for example on the basis of PUR, PUA or lacquers, in particular acrylic lacquers, is already known. For this, for example reference is also to be made to the article "Hochwertige Premiumoberfläche aus Spritzgießß und Reaktionstechnik" from Kunststoffe October 2004, page 180 to 186.

A suitable injection moulding machine, by which such a coating method can be carried out, is disclosed by EP 1 993 802 B1 or DE 10 2006 009 900 A1. Such an injection moulding machine concerns for example a two-plate injection moulding machine, in which on the side of a fixed platen an injection unit, known from the prior art, for thermoplastic plastics, is present. A mixing head sits on the movable platen, which mixing head is connected by a container unit arranged adjacent to the injection moulding machine and to a dosing module for polyol and isocyanate components of a RIM installation. On a carriage which is arranged on the rear side, i.e. on the side facing away from the tool cavity, a movable carriage fastened, which carries a mixing head. The mixing head can be inserted by means of the carriage into a corresponding opening in the cavity and into a corresponding opening in the movable platen. The mixing head is supplied via high pressure hoses with the reaction components of the RIM coating. Such high pressure hoses are designed for example for polyol and/or isocyanate components. Such a machine layout has proved to be successful. However, it is desirable to improve the dosing accuracy of such a RIM coating installation. In individual cases it was found that e.g. in the case of particularly small injection weights of the reaction components with such an arrangement of the RIM coating installation, unsatisfactory results are obtained in this respect.

From WO 03/013824, in particular from FIG. 4 therein, a generic injection moulding machine is likewise known. Also in this injection moulding machine, the RIM coating installation, i.e. the containers for the starting components, the feed pumps and the high pressure pumps, is to be found on a separate pallet, which for example in the illustration according to FIG. 4 of this publication is arranged lying opposite to the thermoplastics injection unit in extension of the machine bed. A mixing head sits in the movable platen and/or in the tool half forming the coating cavity. In individual cases, such a machine layout leads to unsatisfactory dosing accuracies and therefore to quality problems in the finished coated part.

SUMMARY OF THE INVENTION

It is therefore an object of the invention to indicate an injection moulding machine having a coating installation, in particular a RIM coating installation, with which a distinctly improved dosing behaviour of the RIM coating installation is able to be achieved, and therefore an improved component quality if able to be obtained.

Furthermore, it is an object of the invention to indicate a machine layout for an injection moulding machine of the type named in the introduction, which is optimized with regard to space, in order to obtain a higher economic efficiency of the installation with regard to the necessary space requirement, with an optimized footprint.

These problems are solved by an injection moulding machine having a coating installation, wherein the infection moulding machine has at least one fixed platen and one movable platen for the fastening of mould tool halves of at least one mould tool, and the coating installation has first pressure-generating and/or first pressure-conducting means for coating components at a first, relatively low pressure level, and second pressure-generating and/or second pressure-conducting means for the coating components at a second, relatively high pressure level, wherein at least all second pressure-generating and all second pressure-conducting means are coupled to the movable platen so as to be jointly movable along a movement path (100) of the movable platen.

Advantageous embodiments are indicated in the sub-claims.

According to the invention, a generic injection moulding machine, which has a coating installation, in particular a RIM coating installation, wherein the injection moulding machine has at least one fixed platen and one movable platen for the fastening of mould tool halves at least of one mould tool, and the coating installation has first pressure-generating and/or first pressure-conducting means for coating components at a first relatively low pressure level ($p_1$) and second pressure-generating and/or, second pressure-conducting means for the coating components at a second relatively high pressure level ($p_2$), is further developed according to the invention in that at least all the second pressure-generating and all the second pressure-directing means are coupled to the movable platen so as to be jointly movable along a movement path of the movable platen.

Therefore a splitting of the coating installation takes place into a low pressure part (NDT) and a high pressure part (HDT). According to the invention, it was found that coating installations which in the prior art are usually constructed in a compact and highly integrated manner and are housed on a pallet, which contain storage containers, low pressure feed pumps and high pressure pumps, are to be separated to increase the quality of the injection moulded parts. It is proposed according to the invention, also contrary to the usual professional method of procedure, namely to keep the moved mass of the movable platen as small as possible in order to save cycle times, to in fact couple the high pressure pumps, which are distinctly larger and heavier with regard to their overall size compared to the low pressure feed pumps of a coating installation, to the movable platen so as to be jointly movable. For this, usually a mechanical connection on a tray comes into consideration, which tray is connected on the rear side of the movable platen with the latter and if applicable has a separate support with respect to the machine bed. The core of the invention is therefore to mechanically couple the entire high pressure conducting or high pressure generating means of the coating installation to the movable platen or at least to the platen on which a tool cavity is arranged, which is suitable for the coating of an injection moulded blank. Such an arrangement of all high pressure conducting components, therefore all components which either generate or conduct the second pressure level $p_2$, on a movable platen has, in addition, the advantage that connecting lines between the high pressure pumps and the filters or respectively between filters and the mixing head can be constructed so as to be completely or at least predominantly rigidly piped, i.e. can be formed with rigid pipelines, e.g. made of steel.

Depending on the arrangement and construction of the mixing head, it may be necessary to provide a bulkhead plate in the immediate vicinity of the mixing head, up to which bulkhead a rigid piping can lead. Starting from the bulkhead plate, it may be necessary to bridge a relatively short distance by means of flexible high pressure hoses. The length of these high pressure hoses must, however, only be dimensioned to be so great that a dismantling of the mixing head from the mould tool half is possible for maintenance purposes. Depending on whether the mixing head has to be moved in a particular direction for maintenance purposes, it can also be successful, through suitable selection of the high pressure connections on the mixing head, to configure the rigid piping up to the mixing head and therefore to further increase the dosing accuracy.

According to the invention it was namely found that the high pressure conducting flexible hoses, which lead to the mixing head from a high pressure part of the coating installation, which is arranged adjacent to the injection moulding machine, have a considerable influence on the dosing accuracy of the coating material which is to be injected, whether component 1 or component 2, through elastic expansions and/or other deformations. It is therefore also to be regarded as an essential point according to the invention that the flexible hoses used hitherto are replaced by as great a length as possible of rigid piping, in so far as the flexible hoses are high pressure conducting hoses.

Multi-component injection moulding machines, e.g. a two-plate injection moulding machine with a rotary plate arrangement or a three-plate injection moulding machine with a reversing plate unit come into consideration as injection moulding machines which are suitable for the construction of an injection moulding machine according to the invention.

Such injection moulding machines can be converted in a simple manner by the dismantling of one of the available thermoplastics injection units and can offer corresponding installation space for components of the coating installation.

Preferably RIM coating installations come into consideration as coating installation, therefore coating installations which produce a coating material from two components reacting with one another. For this, in particular PU, PUR, PUA or lacquer coating installations come into consideration, in particular an acrylic lacquer coating installation.

However, the coating installation can also be a single-component coating installation.

In a further preferred embodiment, the injection moulding machine is further developed in that the coating installation has a low pressure part, which has at least one storage container for the at least one coating component, and at least one feed pump for the coating component, and has a high pressure part, which for each coating component has at least one high pressure pump and, in the case of a multi-component coating installation, has a mixing head for the mixing of at least two components of the coating material and, in the case of a single-component installation, has an injector.

Expediently, a free line length is formed by means of rigid pipes between high pressure pumps and/or filters and the mixing head at least except for flexible hoses necessary for maintenance purposes. The rigid pipes have the advantage here that smaller expansions take place e.g. with high pressure injecting occurring in a pulse-like manner, and therefore during the injecting of the components into a coating cavity, the predetermined and pre-selected dosing quantities of the coating material can be maintained more precisely. Hereby, the quantity of material of the coating material which is injected is made more precisely reproducibly repeatable, so that an increase in quality for the produced components with the injection moulding machine according to the invention is able to be realized.

A carriage, which is connected to the movable platen and is supported in a displaceably mounted manner with respect to a machine bed of the injection moulding machine, is provided as an expedient embodiment for receiving the high pressure part of the coating installation.

Expediently, the low pressure part of the coating installation is arranged on the machine bed of the injection moulding machine or adjacent to the injection moulding machine, e.g. mounted on a special pallet.

The low pressure part and the movable high pressure part of the coating installation is fluidically connected to flexible hoses, e.g. low pressure hoses for conducting the coating components. These flexible hoses are, however, part of the low pressure part and are therefore also not subjected so intensively to expansions or pressure injection in particular with regard to pulsating stress. Therefore, the hoses balancing the relative movement between low pressure part and high pressure part are preferably low pressure hoses, the flexible behaviour and expansion behaviour of which under impulse-like stress has no substantial influence on the dosing accuracy of the coating components.

Furthermore, it is expedient that at least one colour dosing device is associated with the high pressure part of the coating installation, and the colour dosing device is not arranged so as to be jointly movable with the movable platen.

It can also be expedient to supply two or more injection moulding machines according to the invention, i.e. their high pressure part of the coating installation, by means of a low pressure part of a coating installation. For this, the low pressure lines of the coating installations expediently have respectively a branch, wherein a single low pressure part is connected to two or more high pressure parts of two or more injection moulding machines.

It is therefore successful, with a sufficiently dimensioned low pressure part, to supply several injection moulding machines or respectively their high pressure parts of the coating installation with one and the same batch of the coating components from a common low pressure part.

Furthermore, it is expedient that the injection moulding machine is able to be reverted to a multi-component thermoplastics injection moulding machine, which has two injection units. For example, one of the injection units is arranged as a so-called A-spraying device and one as a so-called F-spraying device. For example, the coating installation is arranged in place of the F-spraying device. By replacement of the coating installation by the F-spraying device, the injection moulding machine is able to be retrofitted again for the production of multi-component injection moulded parts.

Furthermore, it is expedient that on the side of the thermoplastic injection unit an additional injection unit can be arranged in Z-, H-, L- or V-position. Thus, either one further component can be injected in a separate cavity, or for example through a further conversion process an additional component can be injected onto the previously injected and coated component.

It is therefore expedient to arrange at least one further thermoplastics injection unit at or adjacent to the first thermoplastics injection unit.

Furthermore, it can be expedient that the mixing head is connected to the mould tool half, engaging through a central opening of the movable platen also provided for an injection unit.

BRIEF DESCRIPTION OF THE DRAWING

The invention is explained in further detail by way of example below with the aid of the drawings. There are shown.

DETAILED DESCRIPTION OF PREFERRED EMBODIMENTS

Figure 1:
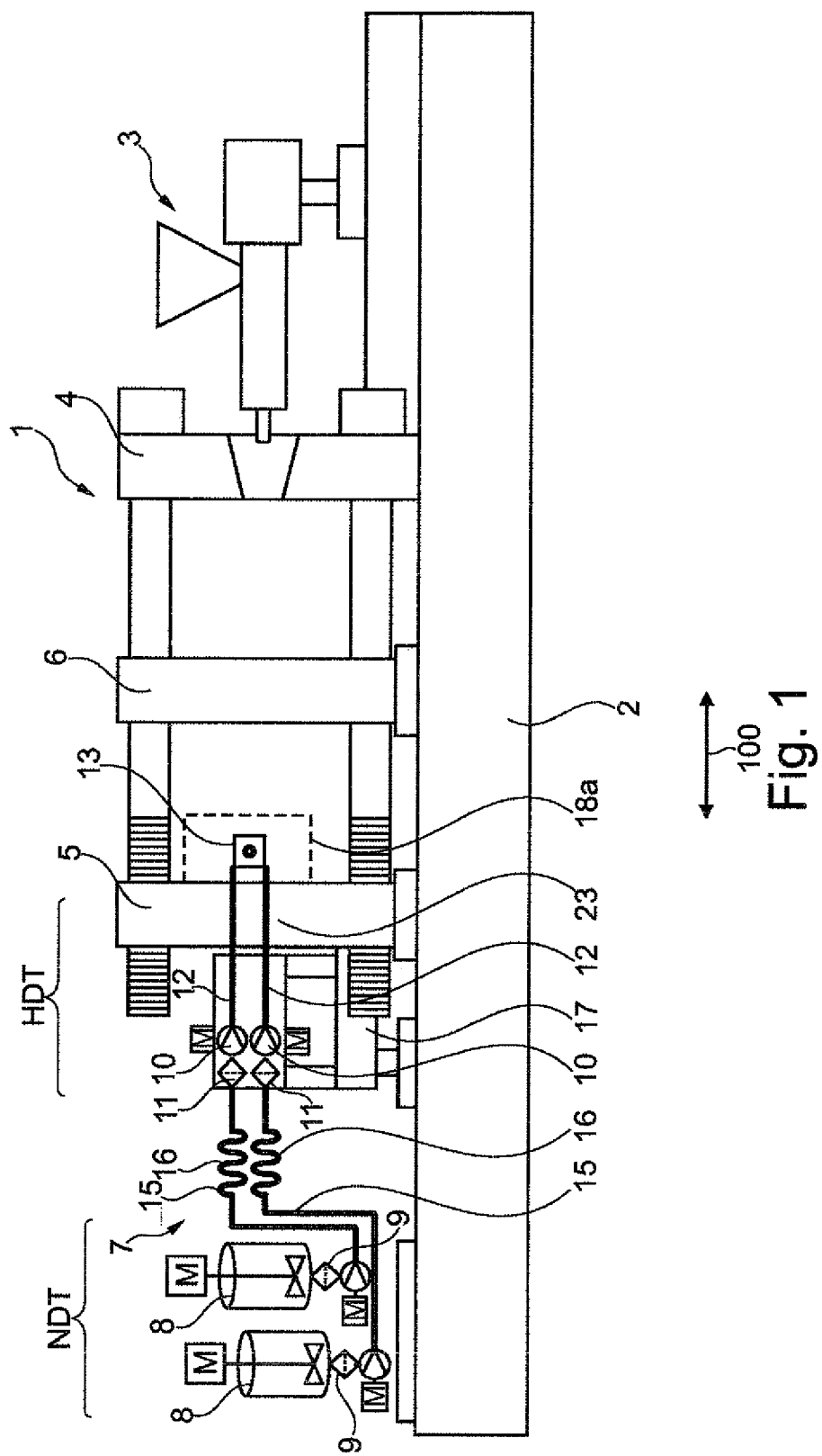
FIG. 1: diagrammatically, a side view onto a first embodiment of the injection moulding machine according to the invention.

FIG. 1 shows first embodiment of an injection moulding machine 1 according to the invention. An injection unit 3 is arranged in a known manner on a machine bed 2 and cooperates with a fixed platen 4. The injection moulding machine according to FIG. 1 is configured as a three-plate injection moulding machine and has, in addition, a movable platen 5 and a reversing plate unit 6.

Furthermore, the injection moulding machine 1 according to the invention in accordance with FIG. 1 has a coating installation 7. The coating installation 7 has a low pressure part NDT and a high pressure part HDT. Associated with the low pressure part NDT are storage containers 8 for coating components and feed pumps 9 for the transport of the coating components at a first relatively low pressure level $p_1$.

In the embodiment according to FIG. 1, the low pressure part NDT is arranged on a lengthened machine bed 2 lying opposite the injection unit 3.

The high pressure part HDT has high pressure pumps 10, wherein a high pressure pump 10 is associated with each coating component. In addition, filters 11 are provided, which are arranged upstream of the high pressure pumps 10 and are therefore still to be assigned to the low pressure part NDT. The high pressure pumps 10 are connected to a mixing head 13 via high pressure connecting lines 12. The mixing head 13 is installed on a tool half (not shown) which is mounted on the movable platen 5. The high pressure pumps 10 are means which generate a second relatively high pressure level $p_2$, the high pressure connecting lines 12 and the mixing head 13 are means for conducting media at the relatively high second pressure level $p_2$.

The low pressure part NDT and the high pressure part HDT are connected to one another by low pressure connecting lines 15, wherein at least one portion of the low pressure connecting lines 15 is formed from flexible lines, e.g. of low pressure hoses 16.

The high pressure part HDT of the coating installation 7 is arranged securely on a carriage 17, wherein the carriage 17 is securely coupled to the movable platen 5. The carriage 17 projects here from the movable platen 5 for a distance in the direction of the free end of the machine bed 2 or respectively of the low pressure part NDT of the coating installation 7 and is supported if applicable with respect to the machine bed 2. The high pressure part HDT is therefore arranged with its second, high pressure generating and/or high pressure conducting means 10, 12, 13 so as to be jointly movable with the movable platen 5. The high pressure generating and high pressure conducting means 10, 12, 13 are designed for the generating/conducting of coating components at a second, relatively high pressure level p2. The connecting lines 12 are configured here preferably as rigid pipelines. This, furthermore, being preferably over the by far greatest portion of their length. Only one partial piece necessary for maintenance purposes has to be formed, if applicable, from a flexible high pressure hose (not shown in FIG. 1), in order to be able to remove the mixing head 13 from a tool half 18a on the movable platen 5 for maintenance purposes. The storage containers 8, the feed pumps 9 and the low pressure connecting lines 15 and the low pressure hoses 16 are to be understood as low pressure generating and low pressure conducting means.

A movement path of the movable platen 5 is represented diagrammatically by the reference number 100.

Figure 2:
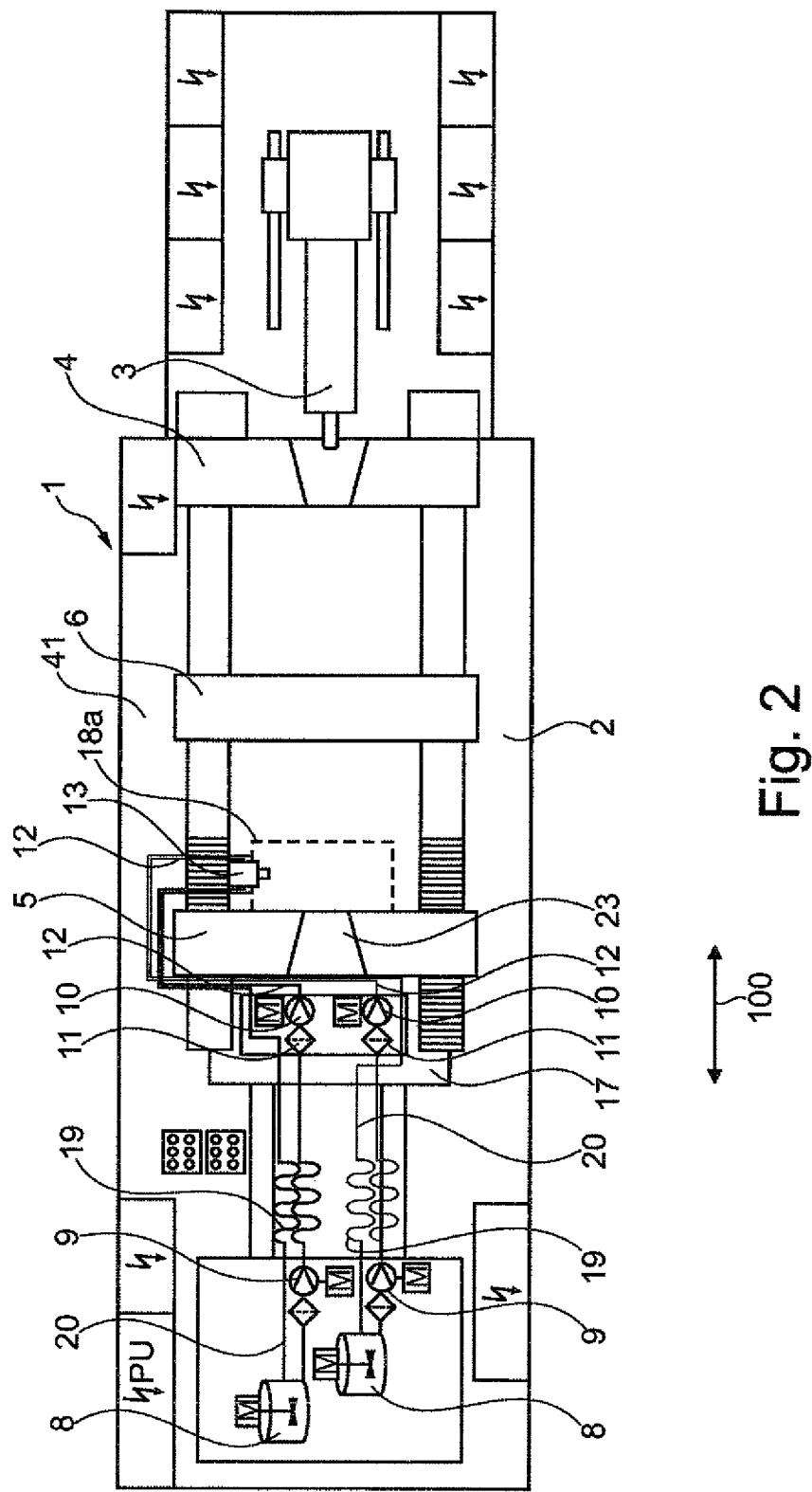
FIG. 2: a top view onto the injection moulding machine according to FIG. 1.

In FIG. 2, the injection moulding machine 1 according to the invention in accordance with FIG. 1 is illustrated in top view. In this respect, the structure of the injection moulding machine according to FIG. 1 corresponds identically to that of the illustration according to FIG. 2, wherein, however, in FIG. 2 it becomes clear that the connecting lines 12, which are configured as high pressure lines, are directed from a rear side of the movable platen 5 around the latter into an intermediate space between the reversing plate unit 6 and the movable platen 5. In this intermediate region, the mixing head 13 is inserted laterally into the mould tool half 18a illustrated in dashed lines in FIG. 2. The remaining components correspond identically to those in FIG. 1.

In addition to the connecting lines 12, return lines 20 for each coating component back into their associated storage container 8 are arranged out from the mixing head 13 directly via at least partially flexibly configured line sections 19. The return lines 20 conduct unrequired coating components from the mixing head 13 at a low pressure level back to the storage container 8. In this respect, a flexible low pressure hose piece can be readily provided as flexible section 19 in the return lines 20. In addition—even if a higher pressure level were to be present in the return lines 20—this can be readily managed with high pressure hoses, because coating components transported in the return lines 20 have no more influence on the dosing accuracy in the mixing head 13 and therefore a pulsating or expanding of the high pressure hoses of the flexible sections 19 no longer has an effect on the quality of the component.

Figure 3:
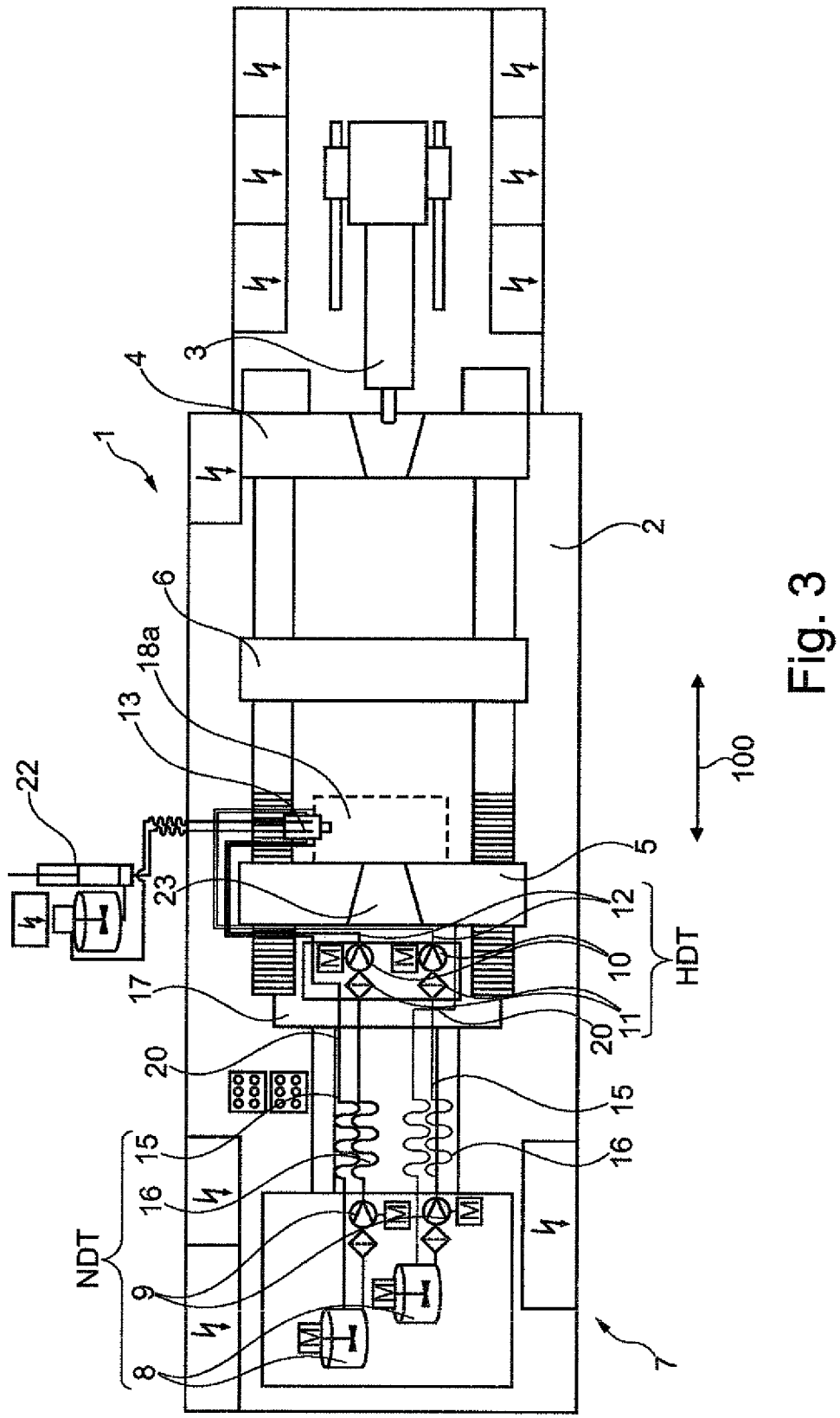
FIG. 3: a top view onto a second embodiment of the injection moulding machine according to the invention.

FIG. 3 shows in top view a modified injection moulding machine 1 according to FIGS. 1 and 2 in an embodiment which has a colour dosing device 22. Otherwise, the structure of the embodiment according to FIG. 3 is identical to the structure according to FIGS. 1 and 2. With the colour dosing device 22 it is possible to deliver colour pigments to the mixing head 13 in a dosed manner, which are mixed in the mixing head 13 with the components of the coating material and are delivered to the mould tool half 18a in a suitable mixture via the mixing head 13.

Figure 4:
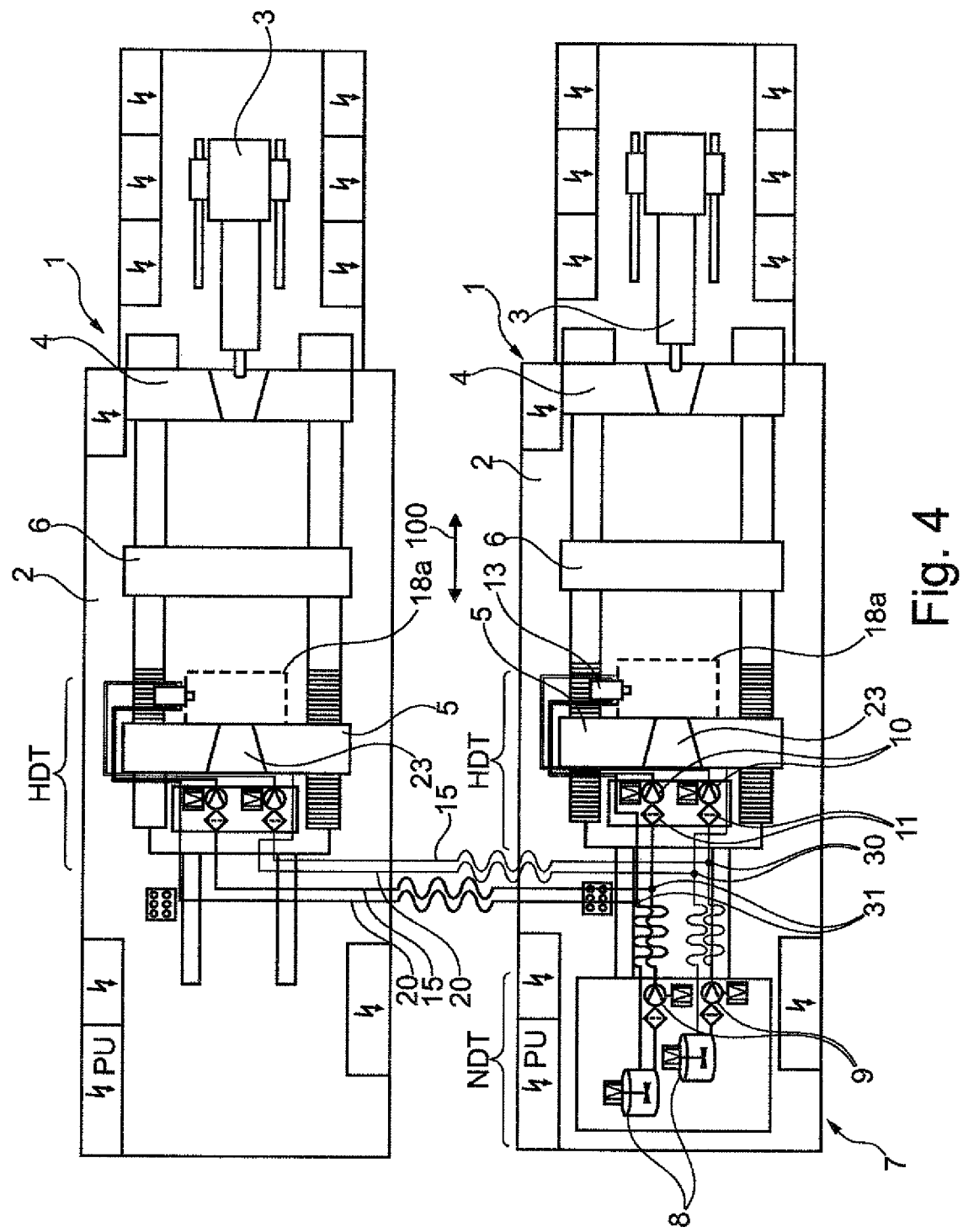
FIG. 4: a top view onto two injection moulding machines according to FIG. 1 supplied with a common low pressure part of a coating installation.

FIG. 4 shows a further embodiment of the invention in top view. In the arrangement illustrated in FIG. 4, two injection moulding machines 1 are arranged adjacent to one another. One injection moulding machine 1 has a low pressure part NDT of the coating installation 7, wherein each of the injection moulding machines 1 has a high pressure part HDT of the coating installation 7, which is arranged respectively according to the invention so as to be jointly movable with the movable tool platen 5 along the movement path 100.

The low pressure connecting lines 15 have branches 30. The return lines 20 have branches 31, so that the low pressure connecting lines 15 and the return lines 20 of the injection moulding machine 1 which has no low pressure part NDT are able to be connected to the return lines 20 and the connecting lines 12 of the other injection moulding machine. Thus, it can therefore be brought about with a single low pressure part NDT of a coating installation 7 that a plurality of high pressure parts HDT of a plurality of injection moulding machines 1 can be supplied by a single low pressure part NDT.

In a further embodiment of an injection moulding machine 1 according to the invention (FIG. 5), the low pressure part NDT of the coating installation 7 is mounted on a separate pallet 40 e.g. on a hall floor 41. A lengthened machine bed 2 is not necessary for this.

Figure 5:
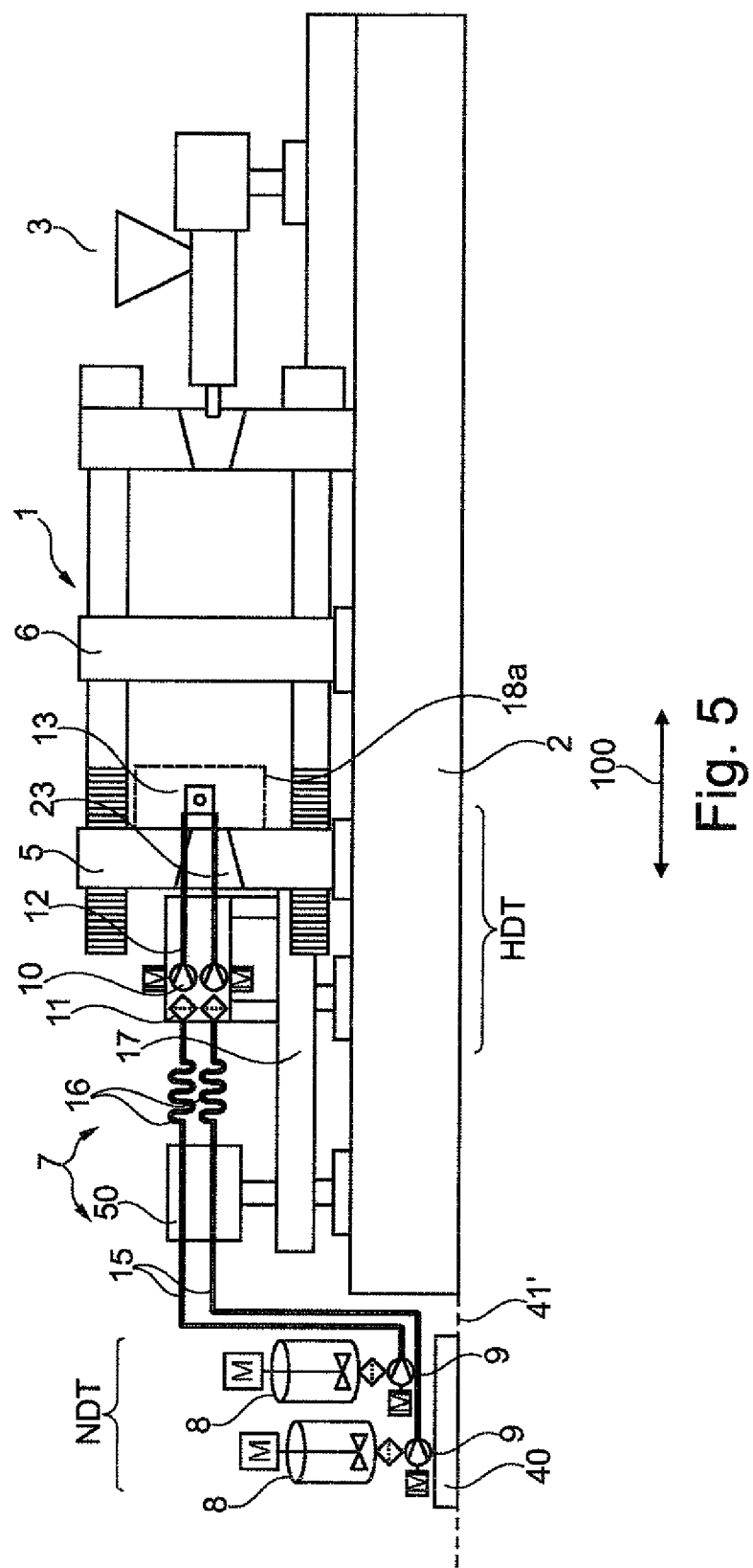
FIG. 5: diagrammatically, a side view onto a further embodiment of the injection moulding machine according to the invention.

The embodiment according to FIG. 5 concerns an injection moulding machine in which a second injection unit can be arranged on the carriage 17 so as to be jointly movable with the movable platen 5 (F-spraying device). In FIG. 5, the possible arrangement of an F-spraying device by the whereabouts of the drive unit 50 of this F-spraying device is illustrated diagrammatically. Compared to the embodiments according to FIGS. 1 to 4, the carriage 17 is configured in a lengthened manner. The high pressure part HDT of the coating installation 7 is situated, in an analogous manner to the embodiments according to FIGS. 1 to 4, directly behind the movable platen 5.

Figure 6:
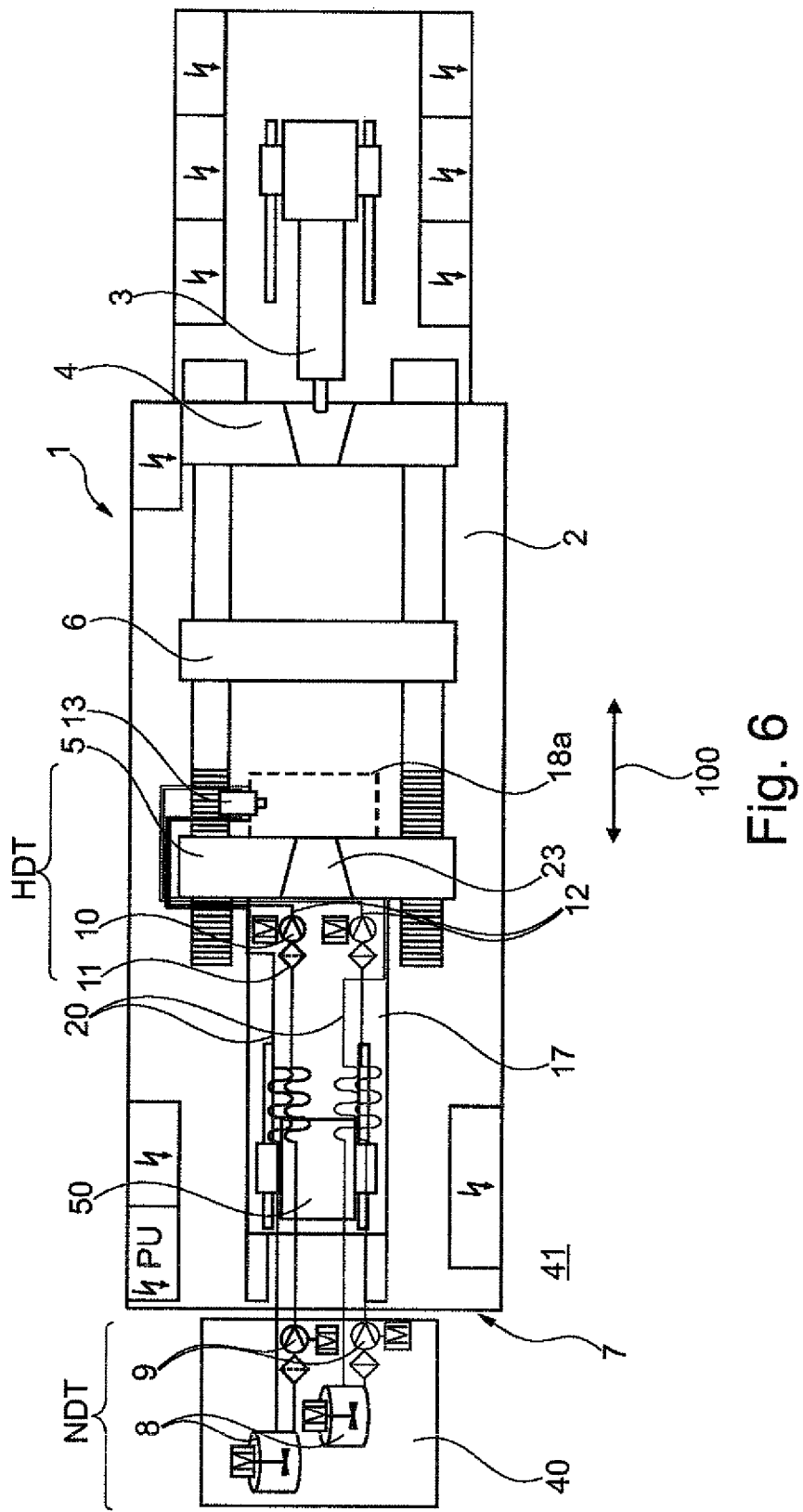
FIG. 6: a top view onto the injection moulding machine according to FIG. 5.

The embodiment according to FIG. 5 is illustrated in top view in FIG. 6. Further modifications can not be seen from the top view.

Figure 7:
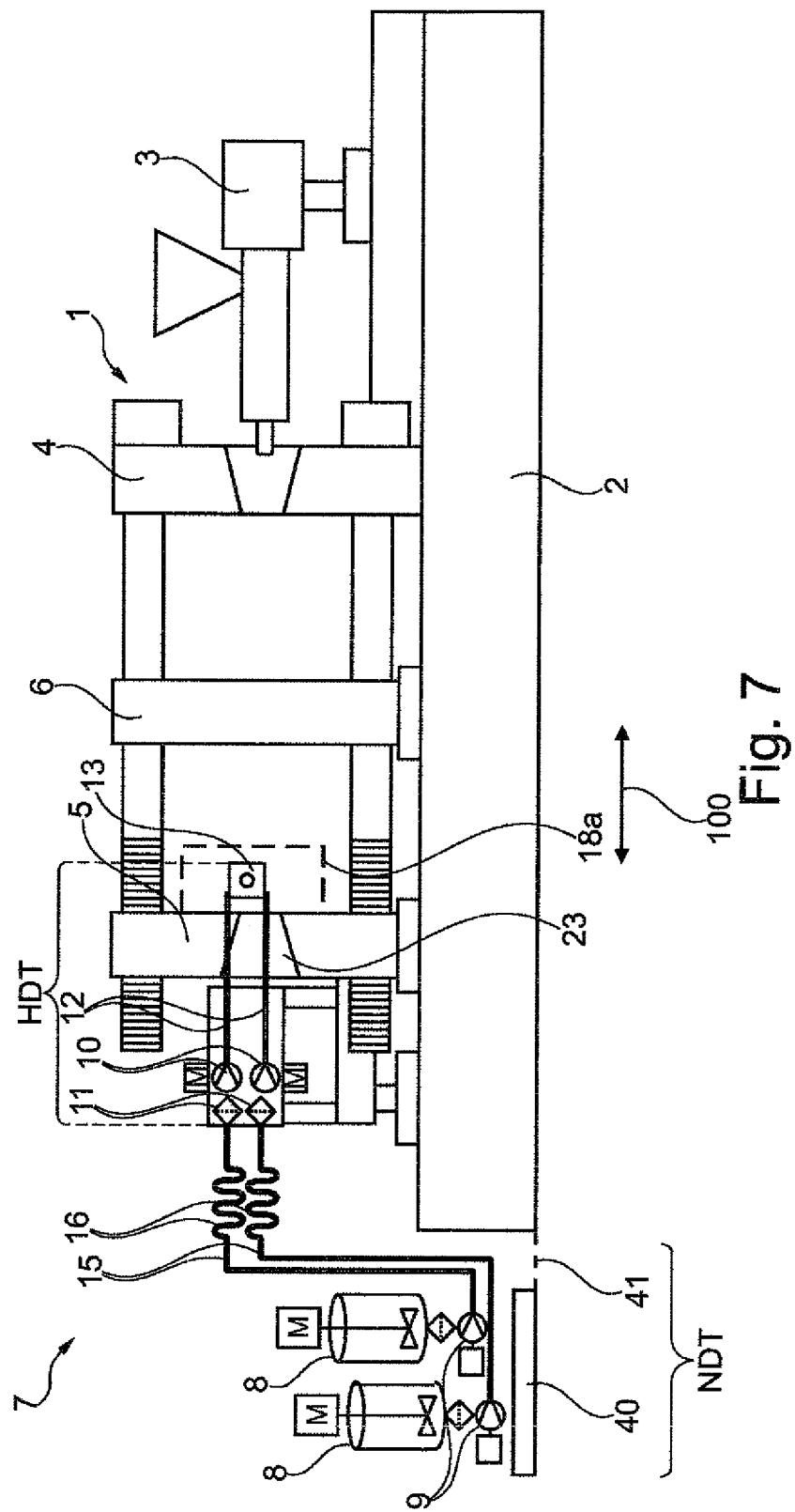
FIG. 7: diagrammatically, a side view onto a further embodiment of the injection moulding machine according to the invention.

FIG. 7 shows a further embodiment of the injection moulding machine 1 according to the invention. The injection moulding machine 1 has a shortened machine bed 2 and corresponds, with regard to construction, substantially to the embodiments according to FIGS. 1 to 4, wherein, however, the arrangement of the low pressure part NDT of the coating installation 7 in an analogous manner to the embodiment according to FIG. 6 on the separate pallet 40 takes place directly on the hall floor 41.

Figure 8:
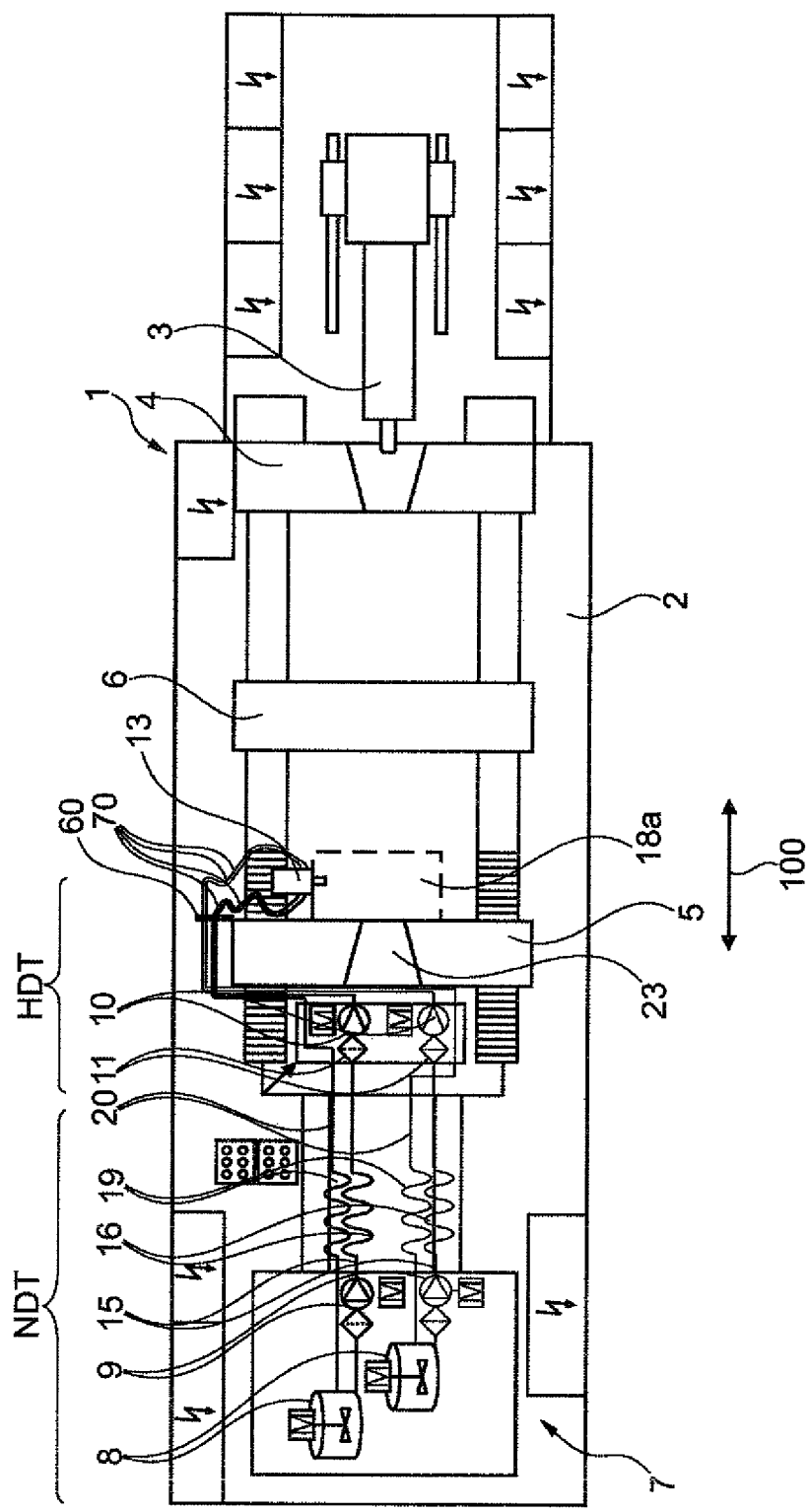
FIG. 8: diagrammatically, a top view onto a slightly modified embodiment of the injection moulding machine according to FIG. 1, and FIG. 9: a further embodiment of an injection moulding machine according to the invention, with a modified position of a mixing head.

FIG. 8 shows a further embodiment of the injection moulding machine according to the invention. The embodiment according to FIG. 8 corresponds to a large extent to the embodiments according to FIGS. 1 to 4. This embodiment is modified with regard to the line conducting of the high pressure conducting means within the high pressure part HDT of the coating installation 7. The connecting lines 12 (high pressure connecting lines) and the return lines 20 are conducted as rigid pipelines up to a bulkhead plate 60. From the bulkhead plate 60 up to the mixing head 13, these lines are configured as flexible high pressure hoses 70 with only a small length. This can be advantageous if for maintenance reasons, e.g. for the case of a necessary dismantling of the mixing head 13 from the mould tool half 18a a movement of the mixing head 13 relative to the movable platen 5 is necessary. Otherwise, the construction of the embodiment according to FIG. 8 corresponds to the embodiments already described according to FIGS. 1 to 4.

Of course, the previously described embodiments and the features described in connection therewith can also be exchanged with one another. Thus, for example, it is of course possible, in an embodiment according to FIG. 6 (having a long carriage 17) to nevertheless lengthen the machine bed 2 in order to arrange the low pressure part NDT on it. In this respect, the features described in connection with the different embodiments of FIGS. 1 to 8 are able, with specialist knowledge and expertise, to be exchanged and transferred to other embodiments.

Furthermore, it is possible that the mixing head 13 is connected to the mould tool half 18a engaging through an opening 23 in the movable platen 5 (FIG. 9). With such an arrangement, a piping/line conducting between the high pressure pumps 10 and the mixing head 13, which is guided around the movable platen 5, is dispensed with. Therefore; the high pressure part HDT of the coating installation 7 can be constructed in a very compact manner.

The invention claimed is:

1. An injection moulding machine, comprising:
   a machine bed;
   a fixed platen supported on the machine bed and having fastened thereon a mould tool half;
   a movable platen supported on the machine bed for movement in relation to the fixed platen and having fastened thereon a mould tool half; and
   a coating installation including a low pressure part for supply of coating components at a first pressure level, and a high pressure part for supply of the coating components at a second pressure level which is higher than the first pressure level, said high pressure part being coupled to the movable platen so as to be jointly movable along a movement path of the movable platen with no relative movement between the high pressure part and the movable platen, said low pressure part being arranged on the machine bed or mounted adjacent to the injection moulding machine.

2. The injection moulding machine of claim 1, wherein the low pressure part includes pressure-generating and/or pressure-conducting means, and the high pressure part includes pressure-generating and/or pressure-conducting means.

3. The injection moulding machine of claim 1, constructed in the form of a multi-component injection moulding machine.

4. The injection moulding machine of claim 1, constructed in the form of a two-plate injection moulding machine with a rotary plate device or in the form of a three-plate injection moulding machine with a reversing plate unit.

5. The injection moulding machine of claim 1, wherein the coating installation is a RIM coating installation for coating material which is to be mixed from at least two components, or is a single-component coating installation.

6. The injection moulding machine of claim 1, wherein the coating installation is a PU-, PUR-, PUA- or a lacquer coating installation.

7. The injection moulding machine of claim 1, wherein the low pressure part includes a storage container for accommodating at least one of the coating components, said high pressure part including a high pressure pump for conveying another one of the coating components and an injector operably connected to the high pressure pump.

8. The injection moulding machine of claim 1, wherein the coating installation is constructed in the form of multi-component coating installation, said high pressure part of the coating installation including a mixing head and at least two high pressure pumps for supply of at least two of the coating components, respectively, to the mixing head.

9. The injection moulding machine of claim 8, wherein the high pressure part includes rigid pipes to bridge a free line length between the high pressure pumps and the mixing head.

10. The injection moulding machine of claim 9, wherein the high pressure part includes flexible hoses incorporated in the free line length between the high pressure pumps and the mixing head for maintenance purposes.

11. The injection moulding machine of claim 1, further comprising a carriage configured to receive the high pressure part of the coating installation, said carriage being connected to the movable platen and supported for displacement with respect to the machine bed.

12. The injection moulding machine of claim 1, wherein the coating installation includes flexible low pressure hoses which are connected to the low and high pressure parts of the coating installation for conducting the coating components.

13. The injection moulding machine of claim 1, further comprising a colour dosing device operably connected to the high pressure part of the coating installation, said colour dosing device being arranged in the absence of a joint movement with the movable platen.

14. The injection moulding machine of claim 1, wherein the low pressure part includes low pressure lines having at least one branch, said low pressure part being connected to two or more of said high pressure part of two or more of said injection moulding machine.

15. The injection moulding machine of claim 1, wherein the injection moulding machine is convertible into an injection moulding machine with two or more injection units for the production of multi-component injection moulded parts.

16. The injection moulding machine of claim 15, wherein the injection units are thermoplastics injection units, with one of the thermoplastics injection units being arranged at or adjacent to another one of the thermoplastics injection units.

17. The injection moulding machine of claim 8, wherein the movable platen has a central opening, said mixing head being connected to the mould tool half of the movable platen while engaging through the central opening of the movable platen.

\* \* \* \* \*